United States Patent Office 2,792,087
Patented May 14, 1957

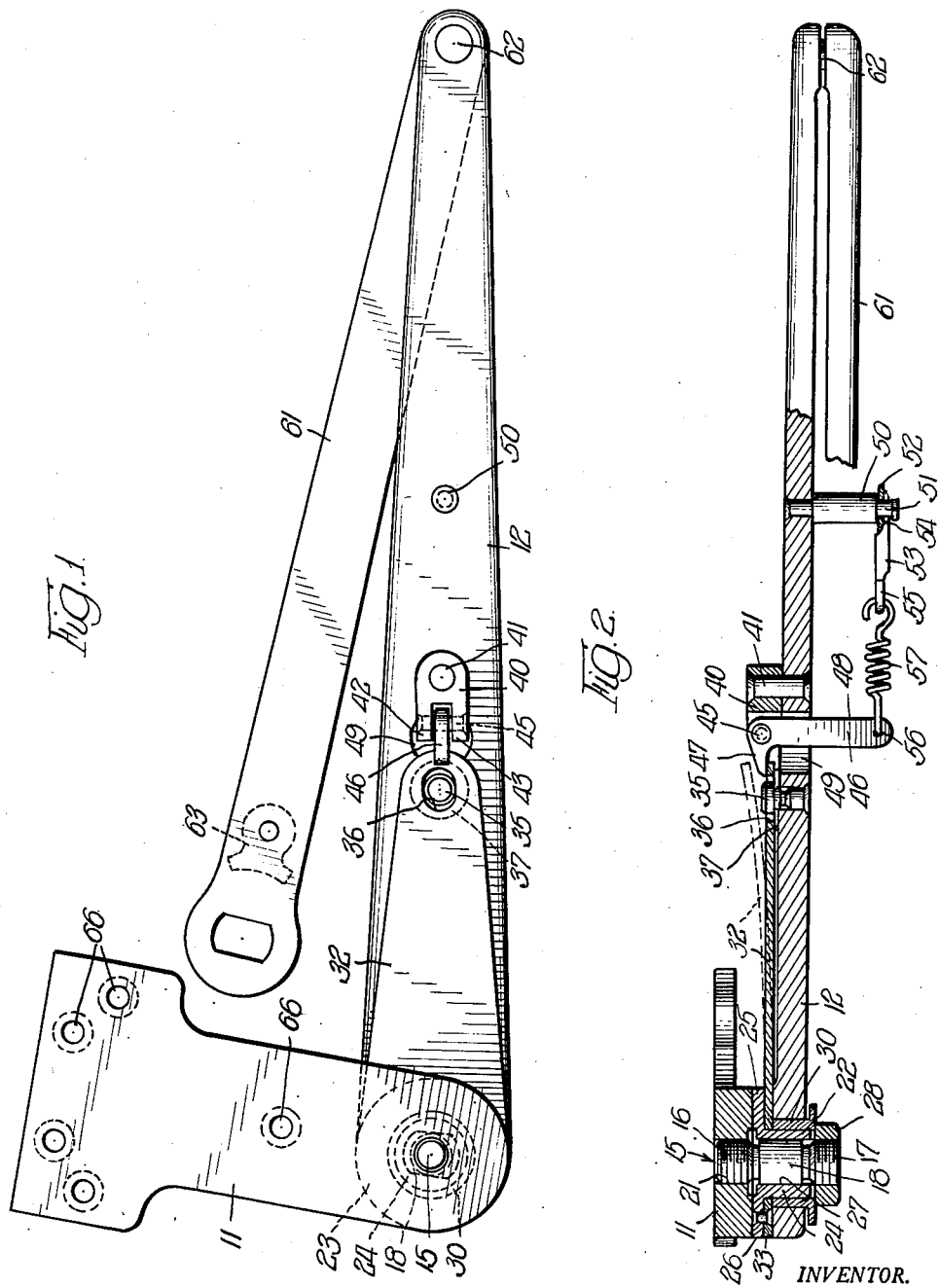

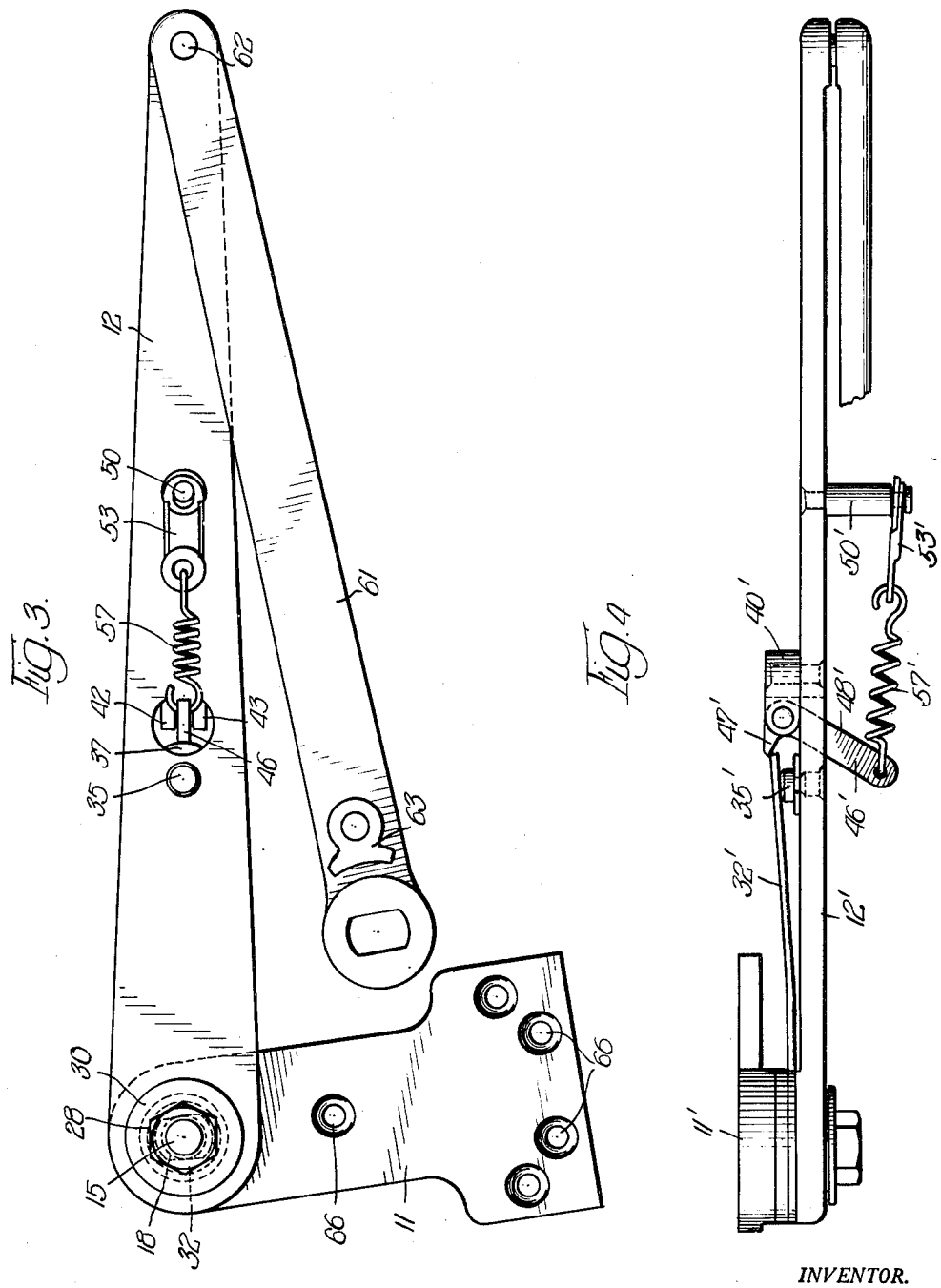

2,792,087

FUSIBLE HOLDING ARM FOR DOOR CLOSERS

Roy L. Pollack, Princeton, Ill., assignor to LCN Closers, Inc., Princeton, Ill., a corporation of Illinois Application September 20, 1954, Serial No. 456,915

9 Claims. (Cl. 189—45)

This invention relates, as indicated, to an improved holding device for doors, and more particularly to a holding device having an automatic release to render such holding device ineffective in the case of fire.

It is an object of this invention to provide a holding device which is releasable when exposed to heat from fires, whereby the door may be closed automatically, cutting off drafts and communication between rooms, so as to prevent or deter the spreading of fires.

It is a further object of this invention to provide a reliable holding arm which depends for its releasing action upon a fusible link of well known construction which will fuse at a predetermined temperature.

It is a still further object of this invention to provide a releasing mechanism, including a spring arm, for releasing the holding arms, upon melting of a fusible link.

It is another object of this invention to provide a holding device for doors and the like which may be used separately or in conjunction with a checking and closing mechanism that will hold the door in any desired open position and which will readily and quickly release the door when subjected to predetermined temperature.

Further objects and advantages of this invention will become evident as the description proceeds and from an examination of the accompanying drawings which illustrate several embodiments of the invention and in which similar numerals refer to similar parts throughout the several views.

In the drawings:

Figure 1 is a plan view of the door holder embodying the invention.

Figure 2 is a fragmentary elevational view, partly in section, of the device shown in Figure 1.

Figure 3 is a bottom view of the device shown in Figure 1.

Figure 4 is a fragmentary side elevational view of an alternative form of the invention.

On referring to the drawings, it will be noted that the invention herein illustrated embodies a soffit plate 11 and a forearm 12, which are mounted on a primary pivot provided by a stud, indicated generally by reference numeral 15 in Figure 2. Stud 15 has threaded extremities 16, 17, and a flat integral section 18. Soffit plate 11 has internal screw threads 21 for screw threaded engagement with the threads 16 of stud 15. As the stud 15 swivels on threads 21 of soffit plate 11, the friction plate 25 is raised and lowered for frictional engagement and disengagement with the friction face 26 of soffit plate 11. A cylindrical boss 24 depends from the friction plate 25. Boss 24 is provided with an opening 27 shaped to snugly fit the flat integral section 18 of stud 15. Thus, stud 15 and boss 24 are incapable of rotating relative to one another about their common axis. Thus, by turning friction plate 25 or boss 24, the stud 15 is turned by screw action in threads 21 of soffit plate 11. A jam nut 28 engages threads 17 of stud 15 to hold the boss 24 on stud 15.

Forearm 12 is rotatably mounted for swivel action about boss 24 by a circular bearing 29. A bushing 30 may be interposed between bearing 29 of forearm 12 and boss 24. Forearm 12 is free to swivel and independently turn about boss 24, except for spring arm 32, which engages forearm 12.

Spring arm 32 is staked, as by rivets 33, to friction plate 25. Spring arm 32 is normally biased upwardly away from forearm 12. As shown in Figures 1 and 2 of the drawings, spring arm 32 is held in locking engagement with forearm 12 by a stud 35, over which aperture 36 in spring arm 32 fits. A washer 37 may be provided on stud 35 between spring arm 32 and forearm 12. With the spring arm 32 held in locking engagement by stud 35, forearm 12 is incapable of any independent swivel motion about boss 24. As the forearm 12 is turned, spring arm 32 is also turned through stud 35. Spring arm 32, being staked to friction plate 25, also turns cylindrical boss 24 to rotate, by screw action, stud 15 on the threads 21 of soffit plate 11.

It will be apparent that forearm 12 may rotate about two pivots. A primary pivot is operative by screw action of stud 15 in soffit plate 11 when spring arm 32 is locked to forearm 12. A secondary pivot is operative about boss 24 when spring arm 32 is released from arm 12.

A locking means is provided for holding spring arm 32 in locking engagement with stud 35. A mounting bracket 40 is staked, as by rivet 41, to forearm 12. Mounting bracket 40 has two ears 42, 43 forming a slot therebetween. A pin or rivet 45 between ears 42, 43 supports lever 46. Lever 46 has a crank arm 47 extending above the upper surface of forearm 12 toward stud 35 for engaging and holding the extremity of spring arm 32. Another crank arm 48 or lever 46 projects through an opening 49 for forearm 12, below the under surface of forearm 12. A post 50 is staked to forearm 12 outwardly of lever 46. Post 50 is provided with a shoulder 51 for holding a washer 52 and fusible link 53. Aperture 54 in the fusible link engages shoulder 51 of post 50 and an aperture 55 engages tension spring 57. Tension spring 57 is held at one end by the aperture 55 in fusible link 53 and at the other end by aperture 56 in lever 46.

A main arm 61 is rotatably mounted on forearm 12 by an arm stud 62 and is provided with a pawl 63.

Soffit plate 11 has apertures 66 for convenience in mounting.

It is believed that the operation of the device is apparent from the foregoing. As forearm 12 is rotated, it also rotates stud 15 on threads 21 of soffit plate 11 for frictional engagement and disengagement between friction plate 25 and the friction face 26 of soffit plate 11 when spring arm 32 is held in locking engagement with stud 35. The force applied to the forearm 12 is transmitted through stud 35, spring arm 32, friction plate 25, boss 9, to stud 15. Spring arm 32 is held in locking engagement with stud 35, although it is normally biased away from the upper surface of forearm 12, by a crank arm 47 which engages the outer extremity of spring arm 32. Crank arm 47 is urged downwardly against spring arm 32 by a tension spring 57 mounted in seriation with a fusible link between the other crank arm 48 of lever 46 and the post 50. In case of fire, the fusible link 53 is melted, breaking the connection between tension spring 57 and post 50, thereby releasing spring arm 32 from the stud 35. Spring arm 32 pops upwardly, out of engagement with stud 35, so that forearm 12 is capable of independent swivel action about post 24.

An alternative form of the invention is shown in Figure 4, which is similar to the device explained herein-above, except that the spring arm is not provided with an aperture. Instead the spring arm merely abuts the stud on the forearm. As shown in Figure 4, soffit plate 11' and forearm 12' are mounted for swivel action about a primary pivot. Forearm 12' is prevented from rotation about a secondary pivot by a spring arm 32' which extends along the upper surface of forearm 12', above stud 35'. The spring arm 32' is locked in engagement with forearm 12' by lever 46', having a crank arm 47' abutting the outer extremity of spring arm 32'. The other crank arm 48' of lever 46' is biased with a tension spring 57', mounted in series with fusible link 53' to post 50'. The operation of this device is similar to the preferred form previously described. When link 53' fuses, spring arm 32' is allowed to move outwardly away from forearm 12' so that forearm 12' is capable of independent rotation about a secondary pivot.

In the drawings and specification, there have been set forth several embodiments of the invention, and although specific terms are employed, they are used in a generic and descriptive sense only and not for purposes of limitation. Changes in the form and in the proportion of parts, as well as the substitution of equivalents are contemplated, as circumstances may suggest or render expedient, without departing from the spirit or scope of this invention, as further defined in the following claims.

I claim:

1. A door holder comprising a first arm, a first friction head at one end of said first arm, a second friction head opposed to said first friction head, a screw member for moving said first and second friction heads relatively toward and away from each other for frictional engagement and disengagement, a second arm rotatably mounted on said second friction head, a spring arm integrally connected at one end to said second friction head and normally biased away from said second arm, and means including a fusible link for holding said spring arm in locking engagement with said second arm.

2. A door holder comprising a first arm, a first friction head at one end of said first arm, a second friction head opposed to said first friction head, a screw member for moving said first and second friction heads relatively toward and away from each other for frictional engagement and disengagement, a second arm rotatably mounted on said second friction head, a spring arm integrally connected at one end to said second friction head extending along the upper surface of said second arm, said spring arm being normally biased away from said second arm, a stud mounted on said second arm below said spring arm, and means including a fusible link for biasing said spring arm into locking engagement with said stud.

3. A door holder comprising a first arm, a first friction head at one end of said first arm, a second friction head opposed to said first friction head, a screw member for moving said first and second friction heads relatively toward and away from each other for frictional engagement and disengagement, a second arm rotatably mounted on said second friction head, a spring arm integrally connected at one end to said second friction head extending along the upper surface of said second arm, said spring arm being normally biased away from said second arm, a stud mounted on said second arm below said spring arm, a lever mounted on said second arm for holding said spring arm against said stud, and means for urging said lever against said spring arm including a fusible link.

4. A door holder comprising a soffit plate, a first friction head at one end of said soffit plate, a second friction head opposed to said first friction head, a screw member between said first and second friction heads to move the same relatively toward and away from each other for frictional engagement and disengagement, a forearm rotatably mounted on said second friction head, a spring arm integrally connected at one end to said second friction head extending along the upper surface of said forearm, said spring arm being normally biased away from said second arm, and means including a fusible link for holding said spring arm in locking engagement with said forearm.

5. A door holder comprising a first arm, a first friction head at one end of said first arm, a second friction head opposed to said first friction head, a screw member for moving said first and second friction heads relatively toward and away from each other for frictional engagement and disengagement, said second friction head having a cylindrical boss depending therefrom, a second arm rotatably mounted on said boss, a spring arm integrally connected at one end to said second friction head extending along the upper surface of said second arm, said spring arm normally biased away from said second arm, means forming an aperture in said spring arm, a stud mounted on said second arm below said spring arm, and means including a fusible link for holding said aperture in said spring arm over said stud.

6. A door holder comprising a first arm, a first friction head at one end of said first arm, a second friction head opposed to said first friction head, a screw member for moving said first and second friction heads relatively toward and away from each other for frictional engagement and disengagement, said second friction head having a cylindrical boss depending therefrom, a second arm rotatably mounted on said boss, a spring arm integrally connected at one end to said second friction head extending along the upper surface of said second arm, said spring arm normally biased away from said second arm, a stud mounted on said second arm below said spring arm, a lever pivotally mounted on said second arm for holding said spring arm against said stud, and means including a spring and fusible link connected in seriation for urging said lever against said stud.

7. A door holder comprising a first arm, a first friction head at one end of said first arm, a second friction head opposed to said first friction head, a screw member for moving said first and second friction heads relatively toward and away from each other for frictional engagement and disengagement, said second friction head having a cylindrical boss depending therefrom, a second arm rotatably mounted on said boss, a spring arm integrally connected at one end to said second friction head extending along the upper surface of said second arm, said spring arm normally biased away from said second arm, a stud mounted on said second arm below said spring arm, a lever pivotally mounted on said second arm, said lever having first and second crank arms, said first crank arm extending above said second arm towards said stud for biasing and holding said spring arm in locking engagement with said stud, said second crank arm extending below said second arm, and means including a spring and fusible link connected in seriation for urging said first crank arm of said lever against said spring arm.

8. In a door holder comprising two arms, said arms being capable of independent rotative movement under one condition, holding means to prevent said independent rotative movement, said holding means comprising a spring arm extending along the upper surface of one arm, said spring arm normally biased away from said arm, a stud mounted on said arm below said spring arm, and means including a fusible link for urging said spring arm into locking engagement with said stud.

9. In a door holder having a first arm, a first friction head at one end of said first arm, a second friction head opposed to said first friction head, a screw pivotal connection between said first and second friction heads to move the same relatively toward and away from each other for frictional engagement and disengagement, means to lock said first and second arms relative to one another by engagement of said friction heads comprising a spring arm integrally connected at one end to said friction head extending along the upper surface of said second arm, said spring arm normally biased away from said second arm, a stud mounted on said second arm below said spring arm, a lever pivotally mounted on said second arm for urging said spring arm into locking engagement with said stud, and a fusible device to release said lock means in case of fire.

References Cited in the file of this patent

UNITED STATES PATENTS

| | | |
|---|---|---|
| 1,315,145 | Mikkelsen | Sept. 2, 1919 |
| 1,358,977 | Norton | Nov. 16, 1920 |